United States Patent [19]

Richards et al.

[11] Patent Number: 5,132,352
[45] Date of Patent: Jul. 21, 1992

[54] TAPE METHOD OF FORMING A THIN LAYER OF DOPED LANTHANUM CHROMITE PARTICLES AND OF BONDING SUCH ON AN ELECTRODE

[75] Inventors: Von L. Richards; Subhash C. Singhal, both of Murrysville, Pa.; Uday B. Pal, Cambridge, Mass.

[73] Assignee: Westinghouse Electric Corp., Pittsburgh, Pa.

[21] Appl. No.: 515,975

[22] Filed: Apr. 27, 1990

[51] Int. Cl.⁵ .......................... C08K 3/10; H01M 6/18; B05D 5/12
[52] U.S. Cl. .................. 524/403; 29/623.5; 427/115
[58] Field of Search ............... 524/403, 407; 29/623.5; 427/115

[56] References Cited

U.S. PATENT DOCUMENTS

| | | | |
|---|---|---|---|
| 4,490,444 | 12/1984 | Isenberg | 429/31 |
| 4,582,766 | 4/1986 | Isenberg et al. | 429/30 |
| 4,597,170 | 7/1986 | Isenberg | 29/623.5 |
| 4,609,562 | 9/1986 | Isenberg et al. | 427/8 |
| 4,631,238 | 12/1986 | Ruka | 429/30 |
| 4,861,345 | 8/1989 | Bowker et al. | 29/623.5 |
| 4,883,497 | 11/1989 | Claar et al. | 29/623.5 |
| 4,895,576 | 1/1990 | Pal et al. | 29/623.5 |
| 4,913,982 | 4/1990 | Kotchick et al. | 427/115 |

*Primary Examiner*—Paul R. Michl
*Assistant Examiner*—Peter Szekely
*Attorney, Agent, or Firm*—Daniel P. Cillo

[57] ABSTRACT

A combustible polymer film, useful for application of an interconnection on an electrode is made by: (1) providing doped $LaCrO_3$ particles; (2) dispersing doped $LaCrO_3$ particles in a solvent, to provide a dispersion; (3) screening the dispersion to provide particles in the range of from 30 micrometers to 80 micrometers; (4) admixing a fugitive polymer with the particles; (5) casting the dispersion to provide a film; (6) drying the film; and (7) stripping the film. The film can then be applied to a porous, preheated electrode top surface, and then electrochemical vapor depositing a dense skeletal $LaCrO_3$ structure, between and around the doped $LaCrO_3$ particles. Additional solid oxide electrolyte and fuel electrode layers can then be added to provide a fuel cell.

15 Claims, 2 Drawing Sheets

TAPE METHOD OF FORMING A THIN LAYER OF DOPED LANTHANUM CHROMITE PARTICLES AND OF BONDING SUCH ON AN ELECTRODE

GOVERNMENT CONTRACT

The Government of the United States of America has rights in this invention pursuant to Contract No. DE-AC-0280-ET-17089, awarded by the U.S. Department of Energy.

BACKGROUND OF THE INVENTION

The present invention relates to a tape method of bonding an electronically conductive interconnection layer on an electrode of an electrochemical cell.

High temperature electrochemical cells are taught in U.S. Pat. No. 4,490,444 (Isenberg). In these type of cells, typified by fuel cells, a porous support tube of calcia stabilized zirconia, has an air electrode cathode deposited on it. The air electrode may be made of, for example, doped oxides of the perovskite family, such as lanthanum manganite. Surrounding the major portion of the outer periphery of the air electrode is a layer of gas-tight solid electrolyte, usually yttria stabilized zirconia. A selected radial segment of the air electrode is covered by an interconnection material. The interconnection material may be made of a doped lanthanum chromite film. The generally used dopant is Mg, although Ca and Sr have also been suggested.

Both the electrolyte and interconnect material are applied on top of the air electrode by a modified electrochemical vapor deposition process, at temperatures of up to 1450° C., with the suggested use of vaporized halides of zirconium and yttrium for the electrolyte, and vaporized halides of lanthanum, chromium, magnesium, calcium or strontium for the interconnection material, as taught in U.S. Pat. No. 4,609,562 (Isenberg). A nickel zirconia cermet fuel electrode, which is applied on top of the electrolyte is also attached by electrochemical vapor deposition; where nickel particles are anchored to the electrolyte surface by a vapor deposited skeleton of electrolyte material, as taught in U.S. Pat. No. 4,582,766 (Isenberg et al.).

U.S. Pat. No. 4,631,238 (Ruka), in an attempt to solve potential interconnection thermal expansion mismatch problems between the interconnect, electrolyte, electrode, and support materials, taught cobalt doped lanthanum chromite, preferably also doped with magnesium, for example $LaCr_{0.93}Mg_{0.03}Co_{0.04}O_3$, as a vapor deposited interconnection material using chloride vapors of lanthanum, chromium, magnesium, and cobalt.

U.S. Pat. No. 4,895,576 (Pal et al.), taught forming a layer of particles, selected from $CaO$, $CaO_2$, $SrO$, $SrO_2$, $CoO$, $Co_2O_3$, $BaO$, $BaO_2$, $MgO$, or $MgO_2$, on the interconnection portion of a fuel cell air electrode, heating the structure, and then vapor depositing a skeletal structure of lanthanum chromite around and between the metal oxide particles. The metal ions of the incorporated metal oxide particles diffuse into the bulk of the lanthanum chromite structure when annealed at higher temperatures. At the end of the process, there is a complete disappearance of the discrete metal oxide particles and it becomes a doped lanthanum chromium oxide structure. This process requires an additional long term annealing step, at about 1,300° C., to maximize conductivity by distributing the dopant in the bulk of the lanthanum chromite film.

It has been found, however, that there are certain thermodynamic and kinetic limitations in doping the interconnection from a vapor phase by an electrochemical vapor deposition process at 1,300° C. to 1,450° C. The vapor pressures of the calcium chloride, strontium chloride, cobalt chloride, and barium chloride are low at vapor deposition temperatures, and so, are not easily transported to the reaction zone at the surface of the air electrode.

Thus, magnesium is the primary dopant used for the interconnection material. However, magnesium doped lanthanum chromite, for example $La_{0.97}Mg_{0.03}CrO_3$, has a 12% to 14% thermal expansion. mismatch with the air electrode and electrolyte material. Additionally, formation of an interconnection coating solely by electrochemical vapor deposition can lead to interconnection thickness variations along the cell length. Then, thin portions would be subject to possible leakage, and thick portions would be subject to increased thermal expansion stresses.

U.S. Pat. No. 4,861,345 (Bowker et al.) taught sintering particles of $LaCrO_3$, doped with Sr, Mg, La, Ba or Co and coated with calcium oxide or chromium oxide, at 1400° C. Here, the coatings on the particles help in sintering by providing a liquid phase and the cations present in these coatings get absorbed into the $LaCrO_3$ structure. However, in this process, sintering the particles to make a leak tight interconnection film and then bonding it to the air electrode can create problems.

None of the proposed solutions solve all the problems of thermal expansion mismatch, and, problems associated with doping calcium, strontium, cobalt, and barium by vapor deposition, or of providing a uniformly thick, leak tight interconnection in a simple and economical fashion. It is an object of this invention to solve such problems.

SUMMARY OF THE INVENTION

Accordingly, the present invention resides in a method of forming a combustible polymer film containing a thin layer of doped $LaCrO_3$ particles, characterized by the steps: (1) providing $LaCrO_3$ particles doped with an element selected from the group consisting of Ca, Sr, Co, Ba, Mg, and mixtures thereof, (2) uniformly dispersing the particles in a solvent to provide a homogeneous dispersion, (3) wet screening the dispersion to provide particles in the range of from 30 micrometers to 80 micrometers, (4) admixing a fugitive polymer with the particles in an amount to provide a homogeneous dispersion with a volume ratio of polymer plus particles:solvent of between 50:50 and 30:70 and a volume ratio of polymer: particles between 65:35 and 50:50, (5) casting the dispersion onto a substrate to provide a film having a wet thickness of from 80 micrometers to 150 micrometers, (6) drying the film, and (7) stripping the film from the substrate, to provide a particle-fugitive polymer film.

The present invention also resides in a method of bonding a dense, high temperature electronically conductive layer on an electrode structure, characterized by the steps: (A) applying a thin particle-fugitive polymer film, having essentially a controlled-spaced monolayer of $LaCrO_3$ particles doped with an element selected from the group consisting of Ca, Sr, Co, Ba, Mg, and mixtures thereof, on a porous portion of a first surface of an electrode structure which is preheated to from 30° C. to 80° C. above the glass transition temperature of the fugitive polymer, while applying a vacuum on the opposite surface of the electrode structure, and then (B) vapor depositing a dense skeletal structure comprising $LaCrO_3$, between and around the doped $LaCrO_3$ particles, where, during initial heating to vapor deposit, the fugitive polymer volatilizes leaving the doped $LaCrO_3$ particles on the electrode surface, and where the particles get incorporated into the deposited lanthanum chromium oxide structure as it grows thicker with time, to provide a dense, high temperature electronically conductive interconnection layer on the porous electrode structure. Preferably, the electrode structure is a porous cathode made of doped $LaMnO_3$, in the form of a tubular structure, optionally supported by a porous, stabilized zirconia support tube. In this method, a protective, fugitive polymer film, including a series of films, can be applied, in step (A'), on the particle-fugitive polymer film before step (B), which top fugitive polymer film is also volatilized during step (B).

The term "electrochemical vapor deposition", as used herein, means applying metal halide vapor, comprising lanthanum halide and chromium halide, to the outer first surface of the porous electrode structure, and applying a source of oxygen to an inner second, opposite surface of the porous electrode structure, in a manner effective that oxygen atoms contact halide vapor at said first surface of the porous electrode structure. This allows a reaction of the oxygen with the metal halide vapor, and formation of a substantially 100% dense lanthanum-chromium oxide structure, where with continued growth, oxygen ions permeate the structure to react with the halide vapor until the desired lanthanum-chromium oxide thickness is achieved. The term "electronically conductive" means conducting electrons but not substantially conducting ions.

Additional steps, including applying a solid electrolyte layer over the remaining portion of the air electrode, and applying a cermet fuel electrode anode over the electrolyte, will complete formation of an electrochemical cell. This method allows easy Ca, Sr, Co, Ba or Mg doping of the interconnection, lowering of the thermal expansion mismatch with the air electrode and electrolyte, and allows a uniformly thick, leak free deposit of interconnect material.

BRIEF DESCRIPTION OF THE DRAWINGS

In order that the invention can be more clearly understood, conventional embodiments thereof will now be described, by way of example, with reference to the accompanying drawings, in which.

DESCRIPTION OF THE PREFERRED EMBODIMENTS

Figure 1:
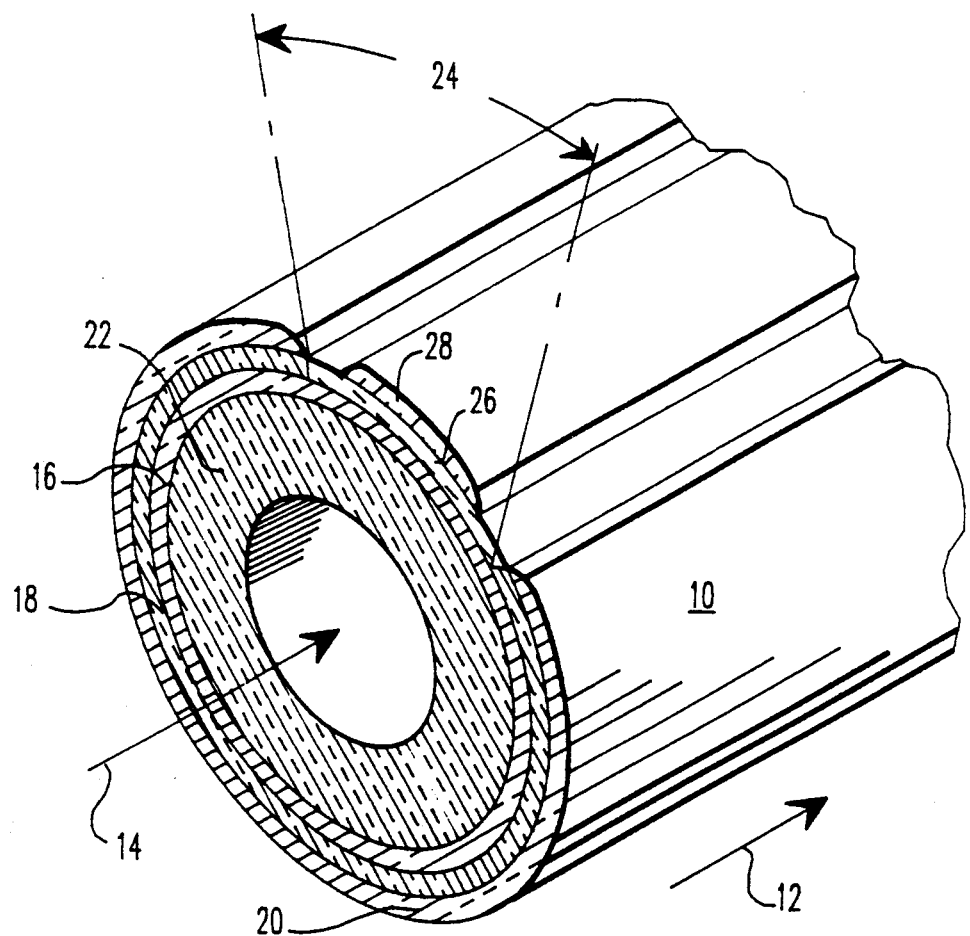
FIG. 1 is a schematic sectional view of a preferred embodiment of a single, tubular electrochemical cell, showing the interconnection layer formed by the method of this invention on top of a supporting electrode.

Referring now to FIG. 1 of the Drawings, a preferred, tubular, electrochemical cell 10 is shown. The preferred configuration is based upon a fuel cell system, wherein a flowing gaseous fuel, such as hydrogen or carbon monoxide, is directed axially over the outside of the cell, as indicated by the arrow 12, and an oxidant, such as air, or $O_2$ indicated by the arrow 14, flows through the inside of the cell. Where the cell is as shown, oxygen molecules pass through porous, electronically conductive electrode structure 16 and are changed to oxygen ions which pass through the electrolyte 18, to combine with fuel at the fuel electrode 20.

It should be noted that the following description of the preferred tubular configuration should not be considered limiting. It should also be noted that the interconnection material of this invention, described hereinafter, could be applied to electrochemical cells other than fuel cells. The term "air electrode" as used throughout means that electrode which will be in contact with oxidant, and "fuel electrode" means that electrode that will be in contact with fuel.

The cell 10 can include an optional, porous support tube 22. The support tube can be comprised of calcia stabilized zirconia, forming a porous wall approximately one to two millimeters thick. The air electrode, or cathode 16 is a porous, composite metal oxide structure approximately 50 micrometers to 1,500 micrometers (0.05 millimeter to 1.5 millimeter) thick. It can be deposited on the support tube by slurry dip and sinter techniques, or extruded as a self-supporting structure. The air electrode is, for example, comprised of doped oxides or mixtures of oxides of the perovskite family, such as $LaMnO_3$, $CaMnO_3$, $LaNiO_3$, $LaCoO_3$, $LaCrO_3$, and the like. Preferred dopants are strontium, calcium, cobalt and nickel.

Surrounding most of the outer periphery of the air electrode 16 is a layer of gas-tight solid electrolyte 18, generally comprised of yttria stabilized zirconia about 1 micrometer to about 100 micrometers thick (0.001 millimeter to 0.1 millimeter). The electrolyte 18 can be deposited onto the air electrode by well known, high temperature, electrochemical vapor deposition techniques. In the case where electrolyte is to be deposited before the interconnection, a selected radial segment or portion 24 of the air electrode 16 is masked during electrolyte deposition and then a layer of a nonporous interconnection material 26 is deposited on this segment or portion 24. If the interconnection is to be deposited first then the electrolyte portion of the air electrode is masked initially.

The dense interconnection material 26, which preferably extends the active axial length of each elongated cell 10 as shown, must be electrically conductive in both an oxidant and fuel environment. The gas-tight interconnection 26 is roughly similar in thickness to the electrolyte, about 30 micrometers to about 100 micrometers (0.03 millimeter to 0.1 millimeter). The interconnection should be non-porous (over about 95% dense) and preferably be nearly 99% to 100% electronically conductive at 1000° C., the usual operating temperature of a fuel cell.

The interconnection must be dense and leakproof and also have a coefficient of thermal expansion close to that of the solid electrolyte, and the electrode onto which it is deposited, and the other components, including the support tube, if used. The usual interconnection material is doped lanthanum chromite, of approximately 20 micrometers to 50 micrometers (0.02 millimeter to 0.05 millimeter) thickness Usually, an electrically conductive layer 28 is deposited over the interconnection 26. This layer 28 is preferably comprised of the same material as the fuel anode 20, nickel or cobalt zirconia cermet, and about the same thickness, 100 micrometers.

Undoped lanthanum chromite is not very useful as an electronic interconnection, due to its combination of marginal conductivity, and mismatch of thermal expansion coefficient with the rest of the fuel cell components. In the method of this invention at least one of Ca, Sr, Co, Ba, and Mg can be included as a dopant throughout the interconnection material 26.

This invention consists of bonding a given amount of individual particles, of desired composition by vapor deposition, preferably by means of an electrochemical vapor deposition (EVD) grown interconnection skeleton. The process consists of depositing these particles, having sufficiently high oxygen mobility, in thin film form, in a monolayer with controlled spacing, over a selected portion of the air electrode surface, in an amount effective to provide compatible thermal expansion properties with other components of the cell in final form, prior to vapor deposition, and then growing the interconnection skeleton in between and around these particles by vapor deposition.

The overall physical, chemical and electrical properties of such composite interconnection will be influenced by the individual properties of the particles and that of the surrounding interconnection skeleton. For example, a deposit of $LaCrO_3$ particles doped with one or more of the elements selected from the group consisting of Ca, Sr, Co, Ba or Mg can be applied on the interconnection site, and then a $LaCrO_3$ interconnection film grown in between and around the particles by vapor deposition. The amount of the particles and/or the concentration of the dopants in the particles could be tailored to obtain the desired thermal expansion, chemical stability and electrical conductivity of the overall interconnection. For example, $LaCrO_3$ particles doped with 2 atom percent each of Sr and Co or Ba and Co and covering 50 volume percent of the interconnection, will give the interconnection a good thermal expansion match with other cell components.

This process will also solve the problem of thin or leaky interconnections. The particle sizes can be suitably chosen, and by virtue of high oxygen mobility in these particles, the vapor deposition grown interconnection skeleton would grow around and over the particles, giving an interconnection of desirable thickness. In the final product, a porous, electronically conductive air electrode structure, 16, in FIG. 1, disposed on optional support 22, has an applied, dense, impervious, thin, interconnection layer 26, preferably a single layer of closely packed, discrete, doped $LaCrO_3$ particles incorporated within a dense, tightly contacting lanthanumchromium oxide skeletal structure, deposited, preferably, by EVD.

Figure 2:
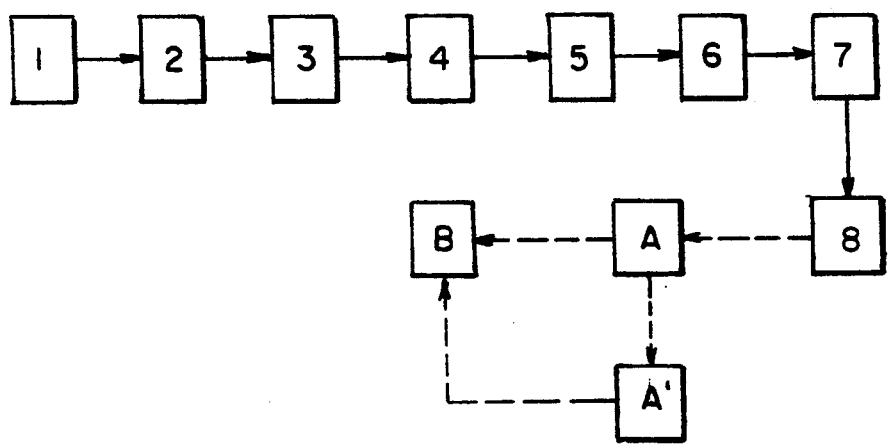
FIG. 2, which best shows the invention, is a block diagram of the method of this invention.

In one method of this invention, particles of doped $LaCrO_3$, for example $La_{0.89}Sr_{0.1}Co_{0.1}Cr_{0.9}O_3$ are provided, step 1 of FIG. 2. These particles are subsequently sized in step 3 to provide particles in the range of from 30 micrometers to 80 micrometers, by getting rid of the fines that cling to the particles. In step 2, the particles are uniformly dispersed in a solvent, preferably also using an effective amount of a dispersing aid, such as polyether polyamine co-polymer, or oxidized Menhaden fish oil, in a range of from 0.1% to 5% of the solvent. Useful solvents include methyl isobutylketone propanol, and methylethylketone ethanol, if an acrylic system is to be used later. Methyamylketone, 1,1,1,trichloroethane, or any solvent solution of a±4.5 MPa ½ (megapascal=meganewton/meter$^2$) cohesion parameter of the polymer to be used, can be useful.

In step 3, these particles are wet screened using appropriate sieves The solvent to dispersing aid ratio is maintained constant during screening by periodic additions of the solvent-dispersing aid mix, if necessary. The desired particle size distribution of the collected particles is between 30 micrometers and 80 micrometers, preferably between 40 micrometers and 60 micrometers. Preferably, within this range, the particles will be restricted to a narrow 10 micrometer to 20 micrometer size range, for example, 30 micrometers to 40 micrometers, 40 micrometers to 50 micrometers, or 50 micrometers to 60 micrometers. The particles are then rinsed with solvent and oven dried at from about 50° C. to 90° C.

In step 4, a predetermined amount of fugitive polymer is mixed with the dried particles to provide homogeneous dispersion. The volume ratio of fugitive polymer:particles is between 65:35 and 50:50, and the volume ratio of fugitive polymer plus particles:solvent is between 50:50 and 30:70. Thus, the admixture contains 50 vol.% to 70 vol.% solvent and the solids contain 35 vol.% to 50 vol.% particles. Under 50 vol.% solvent, it is difficult to get the viscosity of the polymer solution low enough for mixing purposes. Over 70 vol.% solvent, the viscosity is so low that settling rate of the large particles becomes a problem in maintaining homogeneity prior to casting. Under 35 vol.% particulate solids, it is difficult to obtain high enough thermal expansion in the final product layer. Over 50 vol.% particles solids, gas phase access is limited during the vapor deposition step, resulting in trapped pores near the interconnection/air electrode interface.

Useful fugitive polymers are those which will essentially vaporize completely leaving negligible amounts of residue at temperatures less than 1,100° C. The most preferred fugitive polymers are thermoplastic polymers, and include acrylic polymers, such as, for example, poly (methyl methacrylate); polyvinyl chloride polymers polystyrene polymers; polyvinylbutyral polymers; and the like. These materials are available commercially and well known in the art.

After mixing in a mechanical shaker, the dispersion, which is fairly viscous, is cast on a glass or other substrate, in step 5, from which it can be stripped after drying. Casting is preferably by a doctor blade application method. The doctor blade is maintained at about 1.5 to 2.0 times the maximum particle size diameter to provide a wet thickness of from 80 micrometers to 150 micrometers as the blade is drawn across the substrate. The preferred substrate is polytetrafluoroethylene coated glass. The film will preferably have, essentially a monolayer of particles.

The cast particle-fugitive polymer film is dried slowly in step 6, preferably for approximately 10 hours to 20 hours under a suitable atmosphere which is near solvent saturation, to eliminate most solvent and any dispersing aid present. In step 7, the dried film is stripped from the substrate, to provide a particle-fugitive polymer free standing, flexible film having a thickness, preferably, of from approximately 30 micrometers to 80 micrometers. The film is then cut into strips the size of the interconnection.

Figure 3:
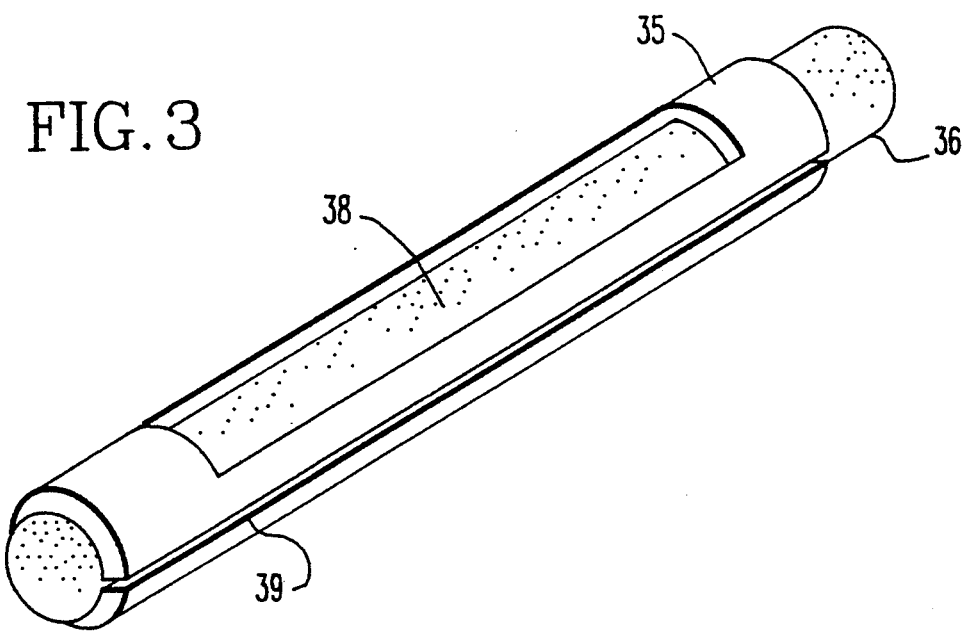
FIG. 3, is an isometric view of one embodiment of a fixture that can be used to provide a film application area on the porous surface of an electrode according to the method of this invention.

This thin, cut film, containing essentially a monolayer of doped $LaCrO_3$ particles with controlled spacing between the particles is then applied to a porous portion of a first surface of an electrode structure. FIG. 3 shows a preferred fixture 35, designed with two halves that can be clamped around a tubular air electrode structure 36. One of the halves has a "window" 38 the size of the interconnection to be applied. The split between the halves is shown as 39. In further step (A), the thin, cut, interconnection film is applied to the air electrode, preferably using fixture 35 and within the window 38. The air electrode will be heated to from 30° C. to 80° C. above the glass transition temperature (Tg) of the plasticized fugitive polymer while, preferably, simultaneously applying a vacuum on the opposite surface of the electrode structure, that is from within the tubular supported or unsupported air electrode tube. The film is thus softened and sucked against the air electrode structure, allowing some flow, and intimate bonding and attachment of the doped $LaCrO_3$ particles to the structure. The fixture is then removed.

In further step (B), a dense skeletal structure, comprising $LaCrO_3$, is vapor deposited, preferably electrochemically vapor deposited (EVD), between and around the doped $LaCrO_3$ particles. The EVD temperature is approximately 1,330° C. During the slow, initial heating of the EVD reactor to the deposition temperature, the fugitive polymer volatilizes leaving, preferably, a particle monolayer with controlled spacing between which the EVD applied skeletal structure will grow. During EVD the doped $LaCrO_3$ particles get incorporated into the lanthanum chromium oxide structure as it grows thicker with time, to provide a dense, high temperature, electronically conductive interconnection layer on the porous electrode structure.

Such dense, high temperature, interconnection layers have the following qualities: (1) There is no particle agglomeration or pile up, because particles are deposited over the air electrode essentially as a monolayer with controlled spacing. (2) Interconnections are leak tight with no air pockets. (3) Interconnections are adequately thick (30 micrometers to 80 micrometers), thus avoiding the leakage problem that is usually caused in thin interconnections. (4) Particle distribution all along the length of the interconnection is uniform. By appropriately choosing the dopant concentration in the particles and the amount of particles to be incorporated in the interconnection, the thermal expansion of the final interconnection can be tailored to match all other components of the electrochemical cell.

Hence, for example, by selecting particles with 15% to 20% higher thermal expansion than the electrolyte, such as $La_{0.89}Sr_{0.1}Co_{0.1}Cr_{0.9}O_3$ or $La_{0.94}Ba_{0.05}Co_{0.1}Cr_{0.9}O_3$, and insuring an almost equal distribution of particle to fugitive polymer, an interconnection film with uniform thermal expansion all along the length which is within 5% of that of the electrolyte, is obtained. (5) The particle-polymer film can be fabricated with a high degree of reproducibility with respect to particle distribution and therefore improved interconnections are fabricated with a high degree of reproducibility. (6) The particle-polymer film can be made with any suitably doped $LaCrO_3$ particles. Depending on the dopant in the $LaCrO_3$ particles, suitable adjustments can be made on the polymer portion of the film in order to maintain the desired uniformity in distribution of the particles in the film.

Figure 4:
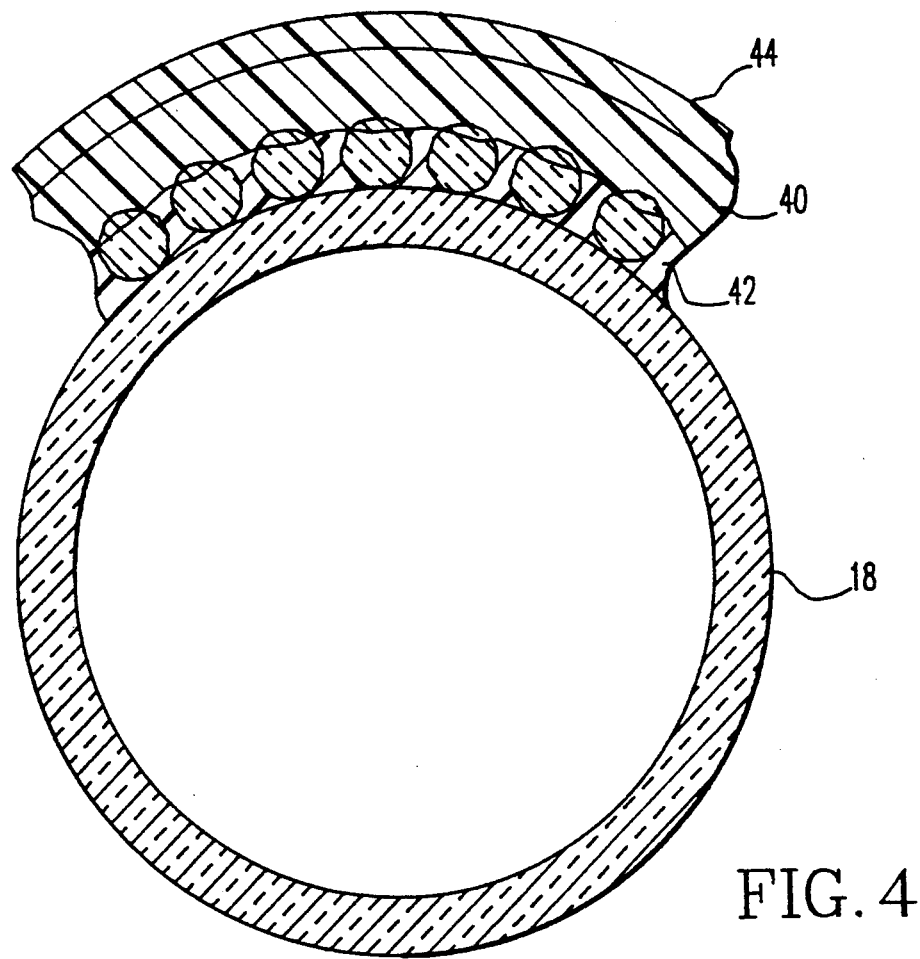
FIG. 4, is a sectional view of the particle-fugitive polymer film formed by the method of this invention applied to an air electrode, and also showing the protective, top, fugitive polymer film.

In order to carry out the EVD reaction, the air electrode is usually masked so that the interconnection layer will form only on the interconnection site. To protect the particle-fugitive polymer film during such masking, additional films can be applied on top of the particle-fugitive polymer film, as shown in FIG. 4. The layer 40, directly on top of the particle-fugitive polymer film 42 is preferably an acrylic film from 0.01 cm to 0.04 cm thick, and the layer 44 over the acrylic film is preferably a polytetrafluoroethylene film 0.002 cm to 0.01 cm thick. While acrylic resin is preferred, any of the thermoplastic, fugitive polymer materials previously described can be substituted.

The acrylic film and the polytetrafluoroethylene film, preferably, can be prepared as a double film layer by solvent casting the plasticized acrylic layer onto the polytetrafluoroethylene layer. This double film layer is then cut to the interconnection strip size and applied over the particle-fugitive polymer film with the acrylic layer facing the particle-fugitive polymer film, as shown. In order to facilitate bonding between the particle-fugitive polymer film and the acrylic layer, heat can be applied with, for example, a heat gun. The air electrode 18, with the three film layer structure over the interconnection site, as shown in FIG. 4, is then masked. After masking the polytetrafluoroethylene layer over the acrylic film is removed.

At the end of this step, we have a masked air electrode with the particle-fugitive polymer film over the air electrode on the interconnection site and over the particle-fugitive polymer film we have a well-bonded acrylic film. During EVD, this top acrylic (or other fugitive polymer) film 40 will be vaporized as will the fugitive polymer component leaving the doped $LaCrO_3$ particles with controlled spacing between them over the electrode.

The weight of doped $LaCrO_3$ particles will constitute from approximately 40 weight % to 85 weight %, preferably from 45 weight % to 70 weight % of the combined interconnection weight, that is particles plus EVD grown skeletal film. The final interconnection layer 26 should be at least 95% dense, preferably over 99% dense. Electrochemical vapor deposition is carried out generally following the principals of U.S. Pat. Nos. 4,609,562 and 4,597,170, both herein incorporated by reference, and the space between the particles gets filled up with $LaCrO_3$, resulting in a dense, leak tight, interconnection, with incorporated particles.

Additional application of a solid electrolyte layer over the remaining portion of the air cathode surface, if the electrolyte is to be applied after the interconnection, applying a cermet fuel electrode over the electrolyte, and then a cermet coating over the interconnection layer, will complete formation of an electrochemical cell, such as a fuel cell. Each fuel cell is preferably tubular and is electrically connected at least in series to an adjacent fuel cell. The electrical connection is made along the axial length of the interconnect through a metal fiber felt not shown in FIG. 1. A typical cell generates an open circuit voltage of approximately one volt, and multiple cells can be connected in series and in parallel in order to provide a desired system voltage.

The invention will now be illustrated with reference to the following Example.

EXAMPLE

Tubular fuel cell structures having most of the components shown in FIG. 1 were constructed. A porous, electronically conductive, tubular, strontium doped, lanthanum manganite ($La_{0.9}Sr_{0.1}MnO_3$) air electrode structure, supported on a porous, tubular, calcia stabilized zirconia support, was used as an electrode structure. The support was approximately 2,000 micrometers (2 millimeters) thick, and the air cathode was approximately 1,000 micrometers (1.0 millimeter) thick. The site where the interconnection was to be deposited was approximately 0.9 cm wide x 30.5 cm long.

Cobalt and strontium doped lanthanum chromite powder particles of the composition $La_{0.89}Sr_{0.1}Co_{0.1}Cr_{0.9}O_3$ were poured into a mixture of 1 part by volume methyl isobutylketone plus propanol solvent solution and 0.02 part by weight polyether polyamine copolymer acting as a dispersing agent. The dispersion was thoroughly mixed in a vibratory mill to wet the fines in the powder. The admixture was then wet screened using appropriate series to obtain a particle size distribution between 50 micrometers and 60 micrometers. The particles between 50 micrometers and 60 micrometers were then rinsed with solvent without the dispersing agent then oven dried at 80° C.

Then, the 50 to 60 micrometer particles were added to a solution of polybutyl methacrylate copolymer (fugitive polymer) in methyl isobutyl ketone propanol solvent solution, with polyether polyamine copolymer added at about 2 wt.% of the solvent solution, so that another homogeneous dispersion is formed, where the volume ratio of acrylic polymer+particles:solvent was 45:55 and the volume ratio of acrylic polymer:particles was approximately 50:50. The composition was then mixed for 20 minutes in a Spex mill shaker. This viscous dispersion was then cast, immediately after shaking, on a polytetrafluoroethylene coated glass plate, 55 cm long × 15 cm wide, using a doctor blade maintained at a height of approximately 102 micrometers. The cast film after drying provided a monolayer of particles with controlled spacing between the particles.

This cast film was dried at room temperature for 16 hours under an air atmosphere which was near solvent saturation. Then the film was dried an additional 24 hours at room temperature in air without added solvent, until it was completely dry. The dry film, which was approximately 60 micrometers thick, was then easily separated from the casting substrate and cut into strips 0.9 cm wide × 30.5 cm long, which was the interconnection area size.

A metal fixture, similar to that shown in FIG. 3 of the drawings, was clamped around the fuel cell air electrode surface. The fuel cell-fixture was then heated to 60° C. which was about 60° C. above the glass transition temperature of the acrylic polymer used. At the same time, a vacuum was applied inside the air electrode. One of the doped $LaCrO_3$ particle-acrylic polymer film strips was then pressed over the porous air electrode through the window in the fixture. The bonding between the air electrode was further enhanced by heating the film strips with a heat gun while continuing to draw a vacuum through the porous air electrode.

Then, a polytetrafluoroethylene film, 0.0076 cm (0.003 inch) thick was doctor blade coated with acrylic film and the composite dried. After drying, the acrylic layer was approximately 0.0127 cm (0.005 inch) thick. The double layer composite was then cut to the interconnection size of 0.9 cm wide × 30.5 cm long and pressed onto the particle-acrylic polymer film with the acrylic layer facing the particle-acrylic polymer film. Heat was applied with a heat gun while rubbing with a teflon rod as a stylus over the polytetrafluoroethylene top layer. This resulted in a construction similar to that shown in FIG. 4 of the drawings. The exposed air electrode of the fuel cell was then appropriately masked to protect it during subsequent electrochemical vapor deposition (EVD), and then the polytetrafluoroethylene layer of the protective composite was removed.

The masked air electrode, with the particle-polymer film over the air electrode on the interconnection site and the acrylic film bonded to the particle-polymer file was loaded in an EVD reactor for a Mg-doped $LaCrO_3$ interconnection deposition run. During the slow heatup of the EVD reactor, to the deposition temperature of 1,330° C., the acrylic film and the polymer volatilized leaving a particle layer with controlled spacing between the particles over the air electrode on the interconnection site. When the porous support tube reached 1,360° C., oxygen plus steam was fed through its inside so that oxygen would diffuse to that top of the air electrode. Lanthanum chloride, chromium chloride, and magnesium chloride vapors, along with hydrogen and argon gas, were then fed to contact the doped lanthanum chromite particles and air electrode structure, using a process based on that taught in U.S. Pat. No. 4,609,562.

The oxygen and metal halide vapors started to react at the air electrode top surface, forming a magnesium doped $LaCrO_3$ skeleton on the air electrode, in between and bonding tightly to the doped $LaCrO_3$ particles. As the reaction continued, the skeleton grew into a $LaCr_{0.988}Mg_{0.012}O_3$ skeletal film incorporating and encapsulating the particles. The electrochemical vapor deposition reaction was discontinued after approximately 1 hour.

The final interconnection film, containing Sr and Co doped $LaCrO_3$ particles within a Mg-doped $LaCrO_3$ matrix skeleton was about 60 micrometers to 75 micrometers thick and well bonded. Cross-section photomicrographs of the EVD reaction bonded interconnection layer showed little particle agglomeration, a minimum of locked-in pores, uniform distribution of particles, and a uniform thickness. The interconnection layer also had a good thermal expansion match with other components of the fuel cell.

We claim:

1. A method of forming a combustible polymer film containing a thin layer of doped $LaCrO_3$ particles, comprising the steps:
    (1) providing $LaCrO_3$ particles doped with an element selected from the group consisting of Ca, Sr, Co, Ba, Mg, and mixtures thereof;
    (2) uniformly dispersing the particles in a solvent to provide a homogeneous dispersion;
    (3) wet screening the dispersion to provide particles in the range of from 30 micrometers to 80 micrometers;
    (4) admixing a fugitive polymer with the particles in an amount to provide homogeneous dispersion with a volume ratio of polymer plus particles:solvent of between 50:50 and 30:70 and a volume ratio of polymer:particles between 65:35 and 50:50;
    (5) casting the dispersion onto a substrate, to provide a film having a wet thickness of from 80 micrometers to 150 micrometers;
    (6) drying the film; and (7) stripping the film from the substrate, to provide a particle-fugitive polymer film.

2. The method of claim 1, where the fugitive polymer is in all cases a thermoplastic polymer which will vaporize at less than 1,100° C.

3. The method of claim 1, where the fugitive polymer is selected from the group consisting of acrylic polymers, polyvinyl chloride polymers, and polystyrene polymers.

4. The method of claim 1, where the solvent in step (2) contains an effective amount of a dispersing aid, where, between steps (3) and (4), the particles are rinsed with solvent and dried, and where the particles screened in step (3) are within a narrow size range within the 30 micrometer to 80 micrometer range.

5. The method of claim 1, where the stripped film is flexible and has a thickness of from 30 micrometers to 80 micrometers, and the particles are essentially in a monolayer.

6. The method of claim 1, where the particles are $LaCrO_3$ doped with dopants selected from the group consisting of Co plus Sr, and Co plus Ba.

7. The method of claim 1, where the particles are selected from the group having the approximate chemical formulas of $La_{0.89}Sr_{0.1}Co_{0.1}Cr_{0.9}O_3$ and $La_{0.94}Ba_{0.05}Co_{0.1}Cr_{0.9}O_3$.

8. The method of claim 1, where the combustible polymer film is applied on a porous portion of a first surface of an electrode structure which is preheated to from 30° C. to 80° C. above the glass transition temperature of the fugitive polymer, while applying a vacuum on the opposite surface of the electrode structure, and then electrochemical vapor depositing a dense skeletal structure comprising $LaCrO_3$, between and around the doped $LaCrO_3$ particles, where, during initial heating the fugitive binder volatilizes.

9. The method of claim 8, wherein the electrode structure is a porous, tubular cathode of doped $LaMnO_3$, and where a protective fugitive polymer film is applied on top of the particle-fugitive polymer film before electrochemical vapor deposition, which top fugitive polymer film is also volatilized during initial heating.

10. The method of claim 8, where solid oxide electrolyte is applied over the remaining portion of the air electrode surface and a cermet fuel electrode is applied over the electrolyte, to provide an electrochemical cell.

11. A method of bonding a dense, high temperature electronically conductive layer on an electrode structure comprising the steps:
(A) applying a thin particle-fugitive polymer film, having essentially a monolayer of $LaCrO_3$ particles doped with an element selected from the group consisting of Ca, Sr, Co, Ba, Mg, and mixtures thereof, on a porous portion of a first surface of an electrode structure which is preheated to from 30° C. to 80° C. above the glass transition temperature of the fugitive polymer, while applying a vacuum on the opposite surface of the electrode structure, and then
(B) electrochemical vapor depositing a dense skeletal structure comprising $LaCrO_3$, between and around the doped $LaCrO_3$ particles, where, during initial heating to vapor deposit, the fugitive polymer volatilizes, and where the particles get incorporated into the lanthanum chromium oxide structure as it grows thicker with time, to provide a dense, high temperature electronically conductive interconnection layer on the porous electrode structure.

12. The method of claim 11, where the electrode structure is a porous, tubular cathode of doped $LaMnO_3$, and where a protective fugitive polymer film is applied on top of the particle-fugitive polymer film before electrochemical vapor deposition, which top fugitive polymer film is also volatilized during initial heating.

13. The method of claim 11, where the fugitive polymer is in all cases a thermoplastic polymer which will vaporize at less than 1,100° C., the particle-fugitive binder film has a thickness of from 30 micrometers to 80 micrometers with the particles essentially in a monolayer, and the particles are $LaCrO_3$ doped with an element selected from the group consisting of Ca, Sr, Co, Ba, Mg, and mixtures thereof.

14. The method of claim 11, where solid oxide electrolyte is applied over the remaining portion of the air electrode surface and a cermet fuel electrode is applied over the electrolyte, to provide an electrochemical cell.

15. The method of claim 11, where, by appropriately choosing the dopant concentration in the particles and the amount of particles to be incorporated in the interconnection, the thermal expansion of the final interconnection can be tailored to match all other components of the electrochemical cell.

* * * * *